Figure 2:
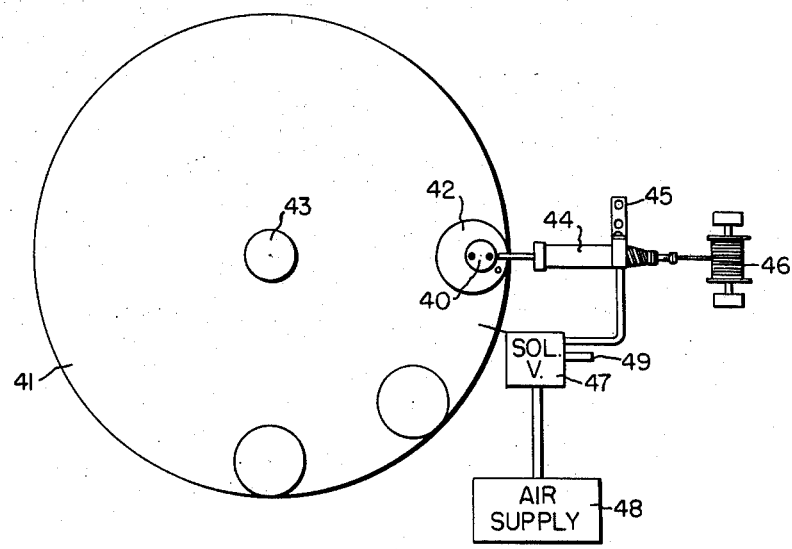

Aug. 26, 1958 R. E. HUNT 2,849,106
FEEDER DEVICE
Filed July 6, 1956 2 Sheets-Sheet 1

INVENTOR.
ROBERT E. HUNT
BY
ATTORNEYS

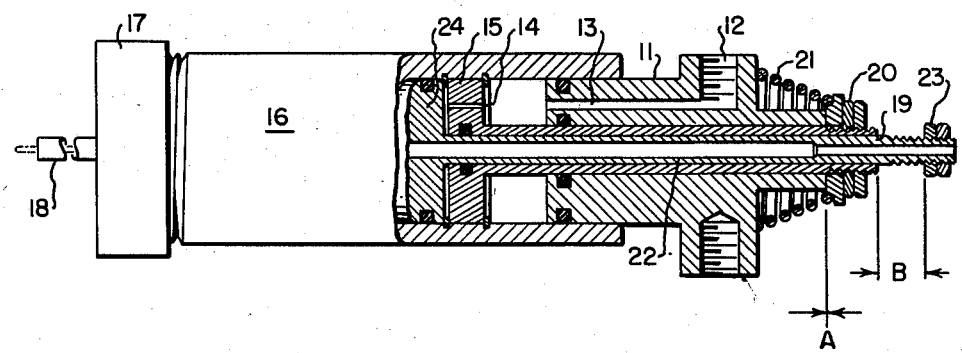
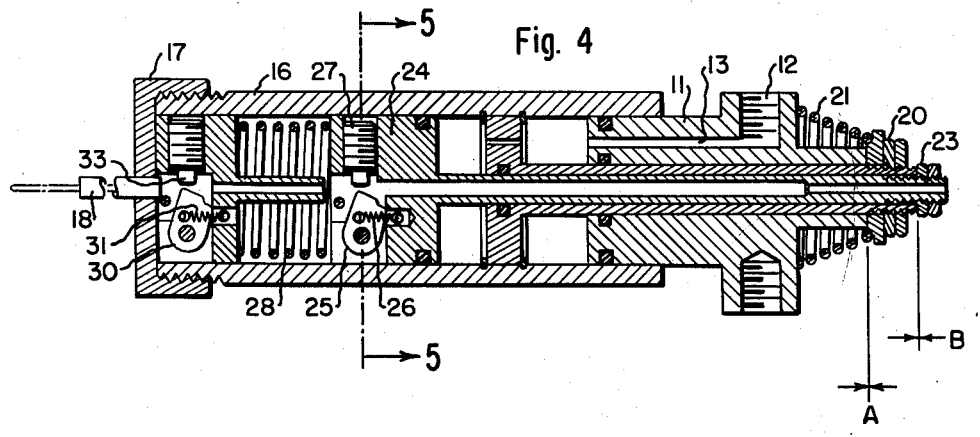
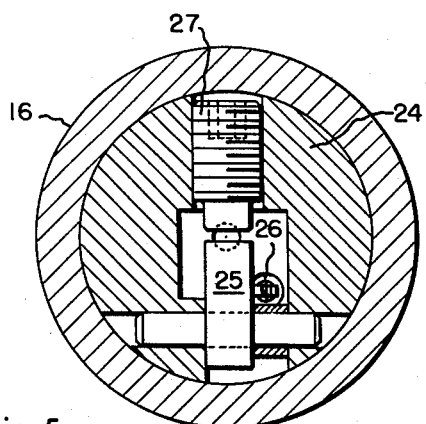

United States Patent Office 2,849,106
Patented Aug. 26, 1958

2,849,106

FEEDER DEVICE

Robert E. Hunt, Wakefield, Mass., assignor to Sylvania Electric Products Inc., Salem, Mass., a corporation of Massachusetts Application July 6, 1956, Serial No. 596,337

14 Claims. (Cl. 203—125)

This invention relates in general to apparatus for feeding filamentary materials solder or wire, and in particular, to such apparatus which has a dual action of feeding solder or wire and of advancing and retracting the feeding device from the work area.

Quite often when manufacturing operations are being carried out on an automatic or semi-automatic basis, parts or components are passed from one work station to another for consecutive processing operations to take place. The usual arrangement is a straight line or circular path along which the parts are conveyed by some mechanical device. The mechanical device has a series of heads, each of which carries a set of parts. The device moves periodically and each head is indexed from one work station to the next. During rest periods of the device the heads pause at the work stations for a sufficient length of time for the necessary operations to be performed on the parts.

In many cases, particularly in the electrical or electronic industries, it is necessary to feed wire or solder to the parts or components at a work station. When wire is being fed, it is usually desired to retract the feeding device after the wire has been fed to the components. Such retraction may be desirable, for example, to provide clearance between the head carrying the components and the wire feeding device as the machine indexes into its next position. In operations where solder is being fed, a further reason for retraction exists. If the feeding device is not retracted from the heat zone at the proper time, a poor solder joint may be formed or incompletely melted solder may be pulled along by the head of the machine as it indexes to its next position. Too, it is highly desirable to remove the feeding device which usually contains a supply of solder from the heat zone where the solder supply might be subjected to sufficient heat to cause melting within the feeding device.

This problem has not gone unrecognized and as a result, numerous solder and wire feeding devices have been developed. In many applications, the devices that have been developed are quite satisfactory. They operate in such a way that at about the time the head of the machine is indexed into position at the work station, a dual action commences. First, the feeding device is advanced into its operating position, following which the solder or wire is fed to the component on the head of the machine. Then, prior to the next index of the machine, the device is retracted and the mechanism which thrusts the wire or solder forward seizes on a new length of wire or solder to feed to the next head of the machine which will reach the work station at the completion of the next index of the machine.

Although, as stated above, some of the machines which have been developed are satisfactory in certain applications, it is also true that they are usually expensive, cumbersome, and unwieldy. Furthermore, many of the machines presently available are not capable of quick and convenient changes of either the stroke of the machine or the length of material being fed. Additional problems arise when it is desired to change the gauge of the material which the machine is set up to feed.

In the electronics industry, perhaps more than in any other industry, it is a common requirement that small parts be processed. Profitable operation requires that the space taken up by any machinery be small and that the operation be inexpensive and preferably automatic. Needless to say, it is highly desirable that the machinery also be inexpensive and capable of operation by unskilled help. The fact that most devices produced by the electronics industry are designed for use in circuits also necessitates considerable use of soldered connection or leads. For these and other reasons, a small, rugged inexpensive solder or wire feeding device would be of great importance to the electronics industry. It is with such a solder or wire feeding device that the present invention is concerned.

Therefore, it is an object of the present invention to expedite the processing of small parts or components.

It is a further object of the present invention to provide a small dual action solder or wire feeding device.

It is a still further object of the present invention to provide a simple solder or wire feeding device which may be used with automatic or semi-automatic machinery.

It is another object of the present invention to provide a feeding device adaptable to a wide range of solder or wire diameters.

It is still another object of the present invention to provide a feeding device in which the length of material being fed and the stroke of the feeding device are easily adjustable over wide ranges.

Figure 1:
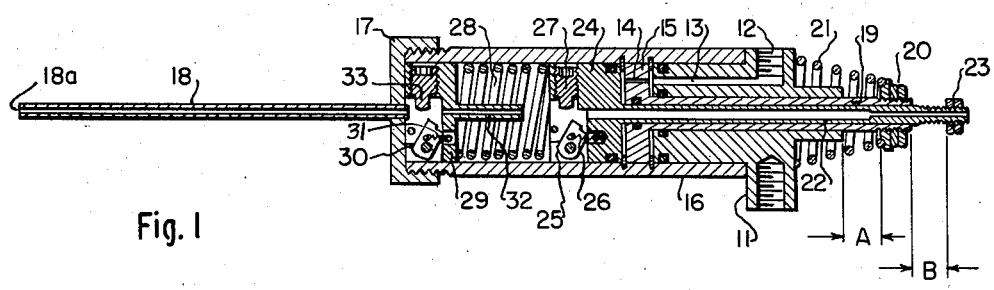

In general, the present invention consists in a small coaxial pneumatic feeding device which moves reciprocally in and out of the work zone at a work station of a processing machine and which feeds a length of wire or solder to components being processed on the machine during the time the device is in an advanced position within the work zone. The major working parts of the feeding device are enclosed within a small rugged cylinder and the complete cycle of feeding material and reciprocation of the feeder is in response to a single influx of air under pressure. Control of the influx of air pressure is easily had by a valve in an air line which may be actuated directly or electrically by a solenoid. The actuation may be in response to movement of a processing machine or may be manually provided. Provision is made for adjustment of the length of stroke of the device in its reciprocating action and also for the length of material fed at each stroke of the device. It is also possible to use the feeding device with a wide range of different diameter wire or solder. For a better understanding of the present invention, reference should be made to the following description of a preferred embodiment thereof selected for purposes of illustration only, which should be read in connection with the accompanying drawings in which:

Fig. 1 is a sectional view of one embodiment of the solder or wire feeding device of the present invention, Fig. 2 is a top view, partly schematic, of the solder or wire feeding device as used with a processing machine of the rotary indexing type, Fig. 3 is a view partly in section of the embodiment shown in Fig. 1 after the first forward movement of the feeding device has taken place, Fig. 4 is a sectional view of the embodiment shown in Fig. 1 after both forward movements of the feeding device have taken place, and Fig. 5 is a cross-section taken through the embodiment of Fig. 4 along the lines 5—5.

In Fig. 1 the internal mechanism of the feeding device for filamentary material is illustrated in some detail. The internal components are shown as they are disposed prior to any feeding action. The bracket 11 is provided as a basic support for the feeding device. For convenience in explaining the motion of the device itself and of the filamentary material being fed, bracket 11 will be used as a fixed point of reference. In normal operation of the device, the threaded hole at the base of bracket 11 is the point of atachment of the device with respect to the work area.

An air line (not shown) may be connected to a radial inlet 12 formed in one portion of bracket 11. A forwardly extending cylindrical portion of bracket 11 fits within a cylindrical housing 16, an O ring being provided between the two members to prevent leakage of air. Air inlet 12 communicates with a passage 13 through bracket 11. Another and smaller passage 14 is formed in a fixed piston 15 which is sealed in postion longitudinally of enclosing cylinder 16, peripheral retaining rings being provided between piston 15 and cylinder 16 to maintain that relationship. Passage 14 need not be in alignment with passage 13, although the passages appear to be in alignment in the drawing. A cap 17 is threaded on one end of cylinder 16 and a hollow tube 18 having a tip 18a passes through the center of cap 17 and communicates with the interior of cylinder 16.

Extending back from fixed piston 15 through a forward extension of bracket 11 is a sleeve 19 having a threaded end on which a nut 20 is engaged. An O ring is placed between sleeve 19 and the forward extension of bracket 11 to permit relative movement of the two parts without significant air leakage. A compression spring 21 is disposed between the rear surface of bracket 11 and nut 20. Within and coaxial with sleeve 19 is a second sleeve or tube 22 which also has a threaded end on which a nut 23 is engaged. An O ring is provided between the two sleeves for the same purposes noted above with reference to bracket 11 and sleeve 19. At the end of sleeve 22 opposite the threaded end is a movable piston 24 which may be integral with sleeve 22 or may be brazed or otherwise sealed in air-tight relationship thereto. Piston 24 closely fits the interior of housing 16 and an O ring is disposed between the two members to prevent air leakage. A central opening is formed in piston 24 in alignment with the opening of sleeve 22.

As is best seen in Fig. 5, on the front of movable piston 24 is a so-called "hitch" 25 which is actually a dog spring-biased against movable piston 24 by a tension spring 26. Diametrically opposite the hitch 25 is an adjusting screw 27 threaded radially into piston 24. A compression spring 28 is disposed between the forward end of movable piston 24 on which hitch 25 and adjustment screw 27 are mounted, and a third piston 29. A second hitch 30 is provided and is biased against piston 29 by a tension spring 31. An adjusting screw 33 opposite hitch 30 is disposed in similar fashion to adjusting screw 27.

Although piston 29 is not permanently anchored against longitudinal movement in cylinder 16 as is fixed piston 15, it does not move relative to cylinder 16 because compression spring 28 maintains piston 29 in position against threaded cap 17. Extending back from piston 29 is a sleeve portion 32 which is coaxial with cylinder 16, sleeves 19 and 22 and tube 18. As is plain from the drawing, a continuous axial opening is provided through the entire length of the device.

In Fig. 2 there is shown schematically a rotating machine having a circular plate 41 which rotates about a hub 43. Mounted symmetrically about the periphery of plate 41 are a series of heads such as 42. Each head carries a set of components 40 which are periodically indexed from one work station to the next. For purposes of explanation of the operation of the feeding device, it may be assumed that a soldering operation is to take plate at the work station shown. The solder feeding device 44 may be assumed to be in a retracted position when the plate 41 indexes head 42 into the station. A heat zone comparable in size to head 42 is created about components 40 by induction or by fires beneath head 42 and when the components have reached a sufficient temperature to permit soldering, solder feeding device 44 is actuated by a switch (not shown) which opens a three-way solenoid valve 47 in a line from a source of air at high pressure 48. Opening of solenoid valve 47 causes air to enter soldering device 44. The device moves forward until its tip is adjacent the components. A predetermined length of solder is then fed from the tip to the components. After sufficient solder has melted on the components, the energizing switch for solenoid valve 47 is released, causing solenoid valve 47 to drop back closing the line to air source 48, and opening an exhaust port 49. Air is permitted to bleed out of the solder feeding device 44 through exhaust port 49 very quickly. The springs of the soldering device which were compressed by the forward movements expand causing almost immediate retraction of the device. The sudden retraction of the device breaks the solder at the tip adjacent the components where the solder is in a molten condition. The break is clean, and the solder is not retracted from the tip leaving the device ready to feed a new length of solder when the cycle is repeated in response to another surge of air pressure. Furthermore, the tip has retracted sufficiently to provide clearance for the head leaving and the next head coming into position at the station. Upon the arrival of the next head and sufficient heating of the component, the entire cycle of movement of the solder feeder is repeated.

The manner in which the operation described above is obtained will become apparent from a consideration of the internal components of the solder feeder as illustrated in Figs. 3 and 4. When air is injected through inlet 12 in bracket 11 it exerts pressure on fixed piston 15 by way of the passage 13 through bracket 11. As previously noted, piston 15 is firmly retained against longitudinal movement in the enclosing cylinder 16. The effect of the air pressure on piston 15 is to move the entire cylinder forward with respect to bracket 11 to the position shown in Fig. 3. This forward movement of the cylinder continues until the nut 20 comes into contact with the rearwardly extending portion of bracket 11. During the forward movement of the cylinder, spring 21 is compressed between the rear surface of bracket 11 and nut 20. The distance which the cylinder moves is indicated by the dimension A on the drawing. Also, the cylinder 16 is separated from the bracket 11 by a distance equal to the dimension A, and the spring 21 is compressed. The nut 20 terminates this first movement by contacting the rearwardly extending portion of the bracket 11.

No solder is actually fed out of the device during the cylinder movement. Tip 18a has moved into the work zone, and solder within the device is carried forward with tip 18a. Solder is drawn from the supply reel and moves relative to bracket 11 but no feeding action occurs at this time.

The solder is held steady in relation to the tip and the housing by hitch 25. During the forward movement of the cylinder, piston 24 on which hitch 25 is mounted also moves forward. Hitch 25 locks the solder against adjusting screw 27 and the solder is thus retained in position within the device.

The second movement of the feeding device may be understood by comparing the showing of Fig. 3 with that of Fig. 4. In Fig. 4 the components of the device are shown in the positions they occupy at the termination of the second movement. The second movement takes place in response to the air pressure which is maintained on the device through the inlet 12 after the first movement takes place. The existence of the opening 14 in fixed piston 15 permits air to exert pressure against the movable piston 24. The effect of the air pressure on movable piston 24 is to move that piston forward relative to cylinder 16 and fixed piston 15. This forward movement continues for a distance labeled "B" on the drawing until the nut 23 on sleeve 22 abuts the end of sleeve 19. During this forward travel of piston 24, a compression spring 28 within the cylinder becomes compressed. Also, during the movement of piston 24 hitch 25 remains in position locking the solder against adjusting screw 27 and thereby moves a length of solder forward and out of tip 18a by the distance B. The solder in its forward movement is not impeded by hitch 30 which is biased against backward movement of the solder relative to it and merely tips forward permitting the solder to move freely over its end.

The solder moving out the tip 18a is used on the components being processed and after the operation is completed, triggering of the switch on the solenoid valve 47 removes air pressure from the solder feeder by way of exhaust tube 49. Removal of the air pressure permits compression spring 28 to force piston 24 back against fixed piston 15. During the retracting movement of piston 24, hitch 30 performs its major function by locking the solder against adjusting screw 33 and holding it fixed in tube 18 as hitch 25 is carried back by piston 24.

Compression spring 21 causes retraction of the cylinder and tip from the work zone as it expands to its normal condition. Compression spring 21 may be so designed as to cause retraction of the feeding device either prior to the retraction of movable piston 24 or subsequent thereto. In any event, at a time dependent primarily upon the relative strength of the compression springs 21 and 28, and to a lesser extent upon the relative sizes of passages 13 and 14, the feeding device itself is moved backward relative to bracket 11 by the action of spring 21. When this action ensues, fixed piston 15 and the enclosing cylinder 16 are moved backward against bracket 11.

Upon completion of the entire cycle, solder has moved forward a total distance of A plus B and has moved backward a distance A. At the conclusion of the cycle, solder is once more available at the tip 18a for the next cycle to take place. As is clear from the drawing, the amount of solder fed during each operation is easily adjusted by changing the position of locking nut 23 on sleeve 22. Similarly, the stroke of the feeder device in and out of the work zone may be adjusted by varying the position of locking nut 20 on the threaded end of sleeve 19. Adjusting screws 27 and 33 are variable to permit a relatively wide range of diameters of solder to be used in the device.

As has previously been noted, adaptation of the device to feed wire to components being processed is relatively simple. A cutting or chopping device might be necessary and could be provided in conjunction with the solder feeder or with the machine on which the components are being processed.

Although what has been described constitutes a preferred embodiment of the invention, numerous modifications and refinements will suggest themselves to those skilled in the art. Such modifications and refinements are believed to be within the reasonable purview of the present invention which should be limited only by the spirit and scope of the appended claims.

What is claimed is:

1. Apparatus for feeding filamentary material comprising a feeding device, support means for said feeding device, means for advancing said feeding device relative to said support means and advancing said filamentary material therewith, means for advancing said filamentary material without advancing said feeding device, and means for retracting said last-mentioned means without retracting said filamentary material.

2. Apparatus for feeding filamentary material comprising a fixed support member, a housing movably disposed upon said support member, means for advancing said housing and said filamentary material simultaneously, relative to said support member, reciprocating means within said housing, means mounted on said reciprocating means for engaging said filamentary material on advance movements of said reciprocating means, and means mounted fixedly within said housing for engaging said filamentary material during retracting movements of said reciprocating means.

3. A dual action feeding device for filamentary material comprising a fixed support member, a housing slidably disposed on said support member, means for moving said housing relative to said support member, means slidably disposed within said housing, means for moving said last-mentioned means relative to said housing, apparatus mounted on said means slidably disposed within said housing for engaging said material during movement of said housing away from said support member and during similarly directed movement of said means slidably disposed in said housing, and apparatus fixedly disposed in said housing for engaging said material during movement of said means slidably disposed in said housing toward said support member.

4. A dual action feeding device for filamentary material comprising a fixed support member having a passage formed therethrough, a housing slidably disposed on said support member, means for supplying fluid under pressure to said housing through said passage, a piston movable in said housing, means mounted on said piston for engaging said filamentary material during movement of said housing relative to and away from said support member and during similarly directed movement of said piston relative to said housing, both movements being in response to said fluid under pressure, means for removing said fluid under pressure, and means mounted in said housing for engaging said material during movement of said piston relative to said housing and toward said support member.

5. A dual action device for feeding filamentary material comprising a support member, a cylindrical housing slidably disposed upon said support member, a piston slidably disposed within said housing, said support member having a passage formed therethrough communicating with the interior of said cylindrical housing, a first spring urging said housing against said support member, a second spring urging said piston through said housing toward said support member, first means for engaging said filamentary material fixed to said piston, second means for engaging said filamentary material fixed relative to said housing, means for applying fluid under pressure to said passage through said support member to cause movement of said cylindrical housing away from said support member against the bias of said first spring and similarly directed movement of said piston within said housing against the bias of said second spring, said first engaging means engaging and feeding said filamentary material in a direction away from said support member during movement of said housing relative to said support member and during movement of said piston within said housing away from said support member, and means for removing said fluid under pressure, said filamentary material being engaged by said second engaging means during movement of said piston in said housing toward said support member in response to urging of said second spring.

6. Apparatus as defined in claim 5 including first means for limiting movement of said housing relative to said support member and second means for limiting movement of said piston relative to said housing.

7. Apparatus as defined in claim 6 including means for adjusting said first and said second movement limiting means.

8. A dual action device for feeding filamentary material comprising a support member having a substantially cylindrical shank, a cylindrical housing having a fixed piston disposed intermediate its ends and a movable piston disposed between one end thereof and said fixed piston, the other end of said cylindrical housing being slidably engaged by said cylindrical shank, said cylindrical shank having a first passage formed therethrough, said fixed piston having a second passage formed therethrough, a source of fluid under pressure, means for applying said fluid under pressure to cause forward movement of said cylindrical housing relative to said support member and forward movement of said movable piston relative to said housing, first means mounted on said movable piston for engaging said material during forward movement of said housing away from said support member in response to said fluid under pressure and during forward movement of said movable piston relative to said housing in response to said fluid under pressure, and second means fixed with respect to said housing for engaging said material during rearward movement of said movable piston upon removal of said air under pressure, said first engaging means during forward movement of said movable piston causing feeding of said material through said one end.

9. Apparatus as defined in claim 8 wherein said first and said second means for engaging said material each comprises a spring-loaded hitch.

10. A dual action feeding device for filamentary material comprising a substantially cylindrical housing having a closed and an open end, a hollow tube centrally penetrating said closed end and communicating with the interior of said cylindrical housing, a support member having a substantially cylindrical shank, a fixed piston disposed in said cylindrical housing intermediate said closed and said open end, said cylindrical housing being fitted over said cylindrical shank in slidable relationship thereto, said cylindrical shank and said fixed piston each having aligned axial openings and non-axial openings formed therethrough, a movable piston disposed within said cylinder between said closed end and said fixed piston, said movable piston having an axial opening formed therethrough, first resilient means for urging said fixed piston into a position with one side thereof against said support member, second resilient means for urging said movable piston against the other side of said fixed piston, a first hitch mounted on said movable piston for engaging material during movement of said movable piston away from said support member, a second hitch mounted in fixed relationship to said housing for engaging said material during movement of said movable piston relative to cylindrical housing toward said support member, means for applying fluid under pressure to said non-axial opening in said cylindrical shank to cause engagement of said material by said first hitch, movement of said housing and of said movable piston to feed said material through said axial openings in said support member, said fixed piston and said hollow tube, and means for removing said fluid under pressure, said first and said second resilient means causing movement of said fixed piston toward said support member and movement of said movable piston toward said fixed piston, said second hitch engaging said filamentary material at least during movement of said movable piston toward said fixed piston.

11. Apparatus as in claim 10 wherein said fixed piston includes an extension passing through and beyond said support member and having a first threaded end and a first locking nut engaged by said first threaded end, said first resilient means being compressed between said extension of said fixed piston and said first locking nut.

12. Apparatus as in claim 11 wherein said movable piston includes an extension passing through and beyond said extension of said fixed piston and having a second threaded end, and a second locking nut engaged by said second threaded end.

13. Apparatus for feeding filamentary material having a reciprocating feeder comprising a support member having a cylindrical shank, a cylindrical housing, a cap enclosing one end of said housing, a hollow tube centrally penetrating said cap, a first fixed piston held in position longitudinally of said housing at a point between said cap and the other end of said housing, means for urging said first fixed piston into a position normally adjacent the end of said cylindrical shank, a movable piston disposed in said housing between said cap and said first fixed piston, a second fixed piston within said housing and adjacent said cap, a resilient member urging said second fixed piston against said cap and normally urging said movable piston against said first fixed piston, an axial opening being formed through said cylindrical shank, said first fixed piston, said movable piston, said second fixed piston and said cap in alignment with the opening in said hollow tube, a first hitch mounted on said movable piston, a second hitch mounted on said second fixed piston, means for introducing fluid under pressure into said housing first to move said housing forward along said cylindrical shank and second to move said movable piston forward within said housing, said first hitch engaging said material during forward movement of said housing relative to said cylindrical shank and during forward movement of said movable piston relative to said housing, said hollow tube being moved with said first movement and said filamentary material being fed from said tube during said second movement, and means for removing said fluid under pressure from said housing, said means for urging said first fixed piston against said cylindrical shank causing rearward movement of said housing, and said resilient member causing rearward movement of said movable piston upon removal of said fluid under pressure, said second hitch engaging said filamentary material at least during said rearward movement of said movable piston.

14. Apparatus for feeding a length of filamentary material from a supply source comprising a hollow cylindrical housing, said housing having a cap attached to the forward end thereof, a forwardly extending hollow tube centrally penetrating said cap, a first piston fixedly attached to the internal wall of said cylindrical housing at a point removed from the forward and from the rearward end of said housing, a supporting member having a first cylindrical portion thereof extending into and slidably disposed relative to the rearward end of said cylindrical housing and having a forward surface normally adjacent a surface of said fixed piston, a rearwardly extending sleeve formed integrally with said first piston and passing through and beyond said supporting member by a first predetermined distance, said sleeve terminating in a threaded end and being slidably disposed relative to said supporting member, a first locking nut engaging said threaded end, said supporting member having a passage formed therein communicating with the interior of said cylindrical housing to permit the introduction therein of air under pressure, said first piston also having a passage therethrough smaller than said passage through said supporting member, a second piston within and slidably disposed relative to said cylindrical housing and normally adjacent said first piston, a first hitch mounted on said second piston for engaging said filamentary material, a first screw mounted on said second piston diametrically opposite said first hitch for providing an adjustable spacing between said first hitch and the end of said first screw, a rearwardly extending tube formed integrally with said second piston, being slidably disposed relative to, and passing through and beyond, said rearwardly extending sleeve by a second predetermined distance, said tube terminating in a threaded end, a second locking nut engaging said threaded end, a third piston disposed within said cylindrical housing adjacent said cap, a second hitch mounted on said third piston for engaging said filamentary material, a second screw mounted on said third piston diametrically opposite said second hitch for providing adjustable spacing between said second hitch and the end of said second screw, a first compression spring disposed between said second piston and said third piston normally urging said third piston against said cap and said second piston against said first piston, and a second compression spring disposed between said supporting member and said first locking nut, said forwardly extending tube and said rearwardly extending tube comprising an axial passage through said cylindrical housing for said filamentary material being fed from said reel, introduction of air under pressure to said passage through said supporting member causing movement of said cylindrical housing forward from said supporting member through said first predetermined distance, said first hitch engaging said filamentary material during forward movement of said cylindrical housing, and further causing movement of said filamentary material out of said forwardly extending tube through said second predetermined distance by movement of said piston and continued engagement of said material being fed by said first hitch, removal of said air under pressure from said passage causing retraction of said cylindrical housing and of said second piston, said filamentary material being engaged by said second hitch at least during retraction of said second piston.

References Cited in the file of this patent

UNITED STATES PATENTS 2,111,308   Baxendale _____ Mar. 15, 1938